United States Patent [19]

Wambeke et al.

[11] Patent Number: 5,562,295
[45] Date of Patent: Oct. 8, 1996

[54] ENVIRONMENTAL SEALING

[75] Inventors: Alain Wambeke, Zoutleeuw; Joseph Willems, Bertem, both of Belgium

[73] Assignee: NV Raychem SA, Belgium

[21] Appl. No.: 367,342

[22] PCT Filed: Aug. 25, 1993

[86] PCT No.: PCT/GB93/01810

§ 371 Date: May 14, 1995

§ 102(e) Date: May 14, 1995

[87] PCT Pub. No.: WO94/05943

PCT Pub. Date: Mar. 17, 1994

[30] Foreign Application Priority Data

Sep. 4, 1992 [GB] United Kingdom ............... 9218755

[51] Int. Cl.⁶ ..................................................... F16J 15/46
[52] U.S. Cl. ............................ 277/34; 277/227; 137/223
[58] Field of Search ........................ 277/34, 34.3, 34.6, 277/227; 137/223

[56] References Cited

U.S. PATENT DOCUMENTS

| | | | |
|---|---|---|---|
| 907,136 | 12/1908 | Farrington et al. | |
| 2,306,160 | 12/1942 | Freyssinet | 277/34 |
| 2,816,575 | 12/1957 | Stokes | 138/48 |
| 3,038,732 | 6/1962 | Scott et al. | 277/34 |
| 3,339,011 | 8/1967 | Ewers, Jr. et al. | 174/92 |
| 3,410,300 | 11/1968 | Mondano | 137/223 |
| 3,491,825 | 1/1970 | Peterson et al. | 277/34 |
| 4,263,682 | 4/1981 | Bejarano | 137/223 |
| 4,296,933 | 10/1981 | Tolliver | 277/34.3 |
| 4,662,883 | 5/1987 | Bell et al. | 623/8 |
| 4,790,544 | 12/1988 | Kemp | 277/34 |

FOREIGN PATENT DOCUMENTS

| | | | |
|---|---|---|---|
| 0100228A2 | 2/1984 | European Pat. Off. | H02G 15/18 |
| 0152696A3 | 8/1985 | European Pat. Off. | F16L 7/00 |
| 0210807A2 | 2/1987 | European Pat. Off. | F16L 47/00 |
| 0179657B1 | 8/1989 | European Pat. Off. | F16L 5/02 |
| 1077314 | 7/1967 | United Kingdom . | |
| 1208420 | 10/1970 | United Kingdom . | |
| 1287872 | 9/1972 | United Kingdom | B67D 5/00 |
| 1421960 | 1/1976 | United Kingdom | F16J 15/46 |
| 2006890 | 5/1979 | United Kingdom | F16J 15/46 |
| 2028601 | 3/1980 | United Kingdom | H02G 15/08 |
| 1594937 | 8/1981 | United Kingdom | F16L 25/00 |
| 2080914 | 2/1982 | United Kingdom | F16L 55/12 |

*Primary Examiner*—Daniel G. DePumpo
*Attorney, Agent, or Firm*—Herbert G. Burkard; Sheri M. Novack

[57] ABSTRACT

A flexible hollow sealing member that can be inflated through a hole in a wall thereof to seal to a first article, the member having: a first sealing material at an inwardly-facing surface of the wall, which first sealing material can be deformed to block the hole by pressure within the member when inflated; and a device for maintaining, during deformation of the first sealing material, separation between the article and an outwardly-facing surface of the wall immediately adjacent the hole.

15 Claims, 6 Drawing Sheets

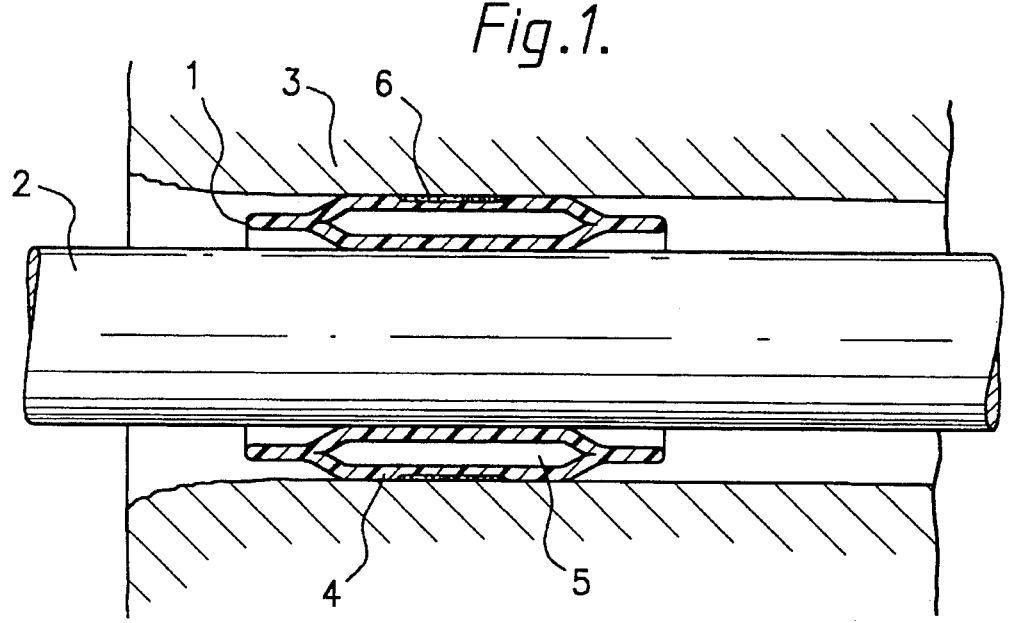
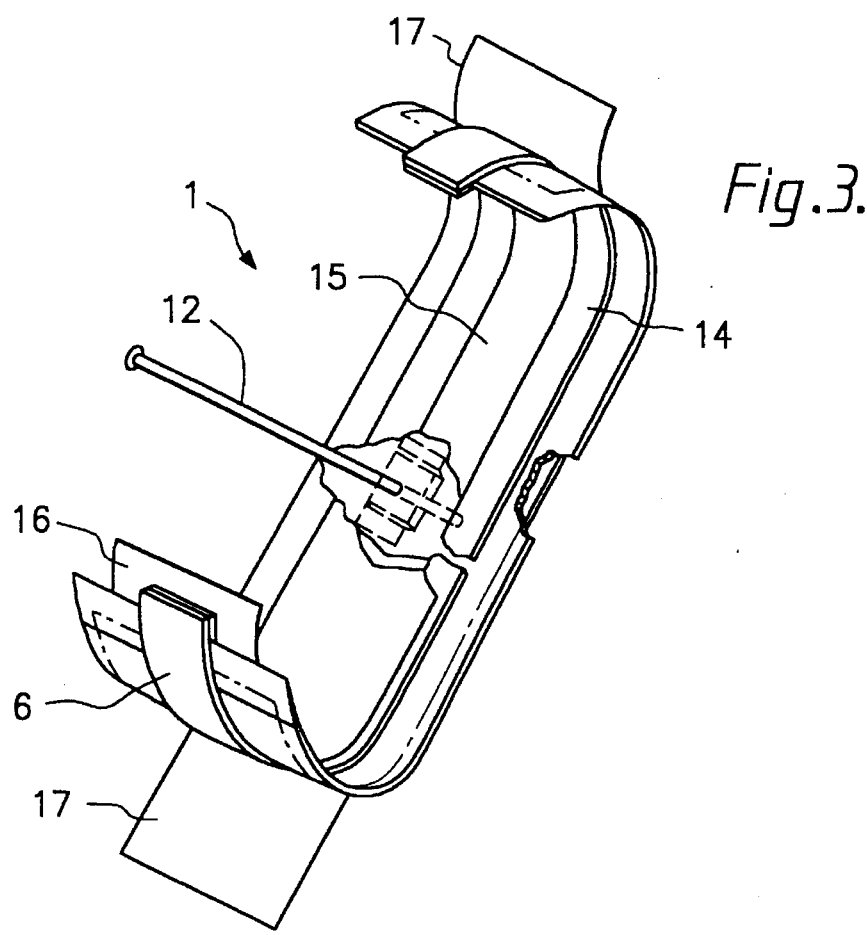

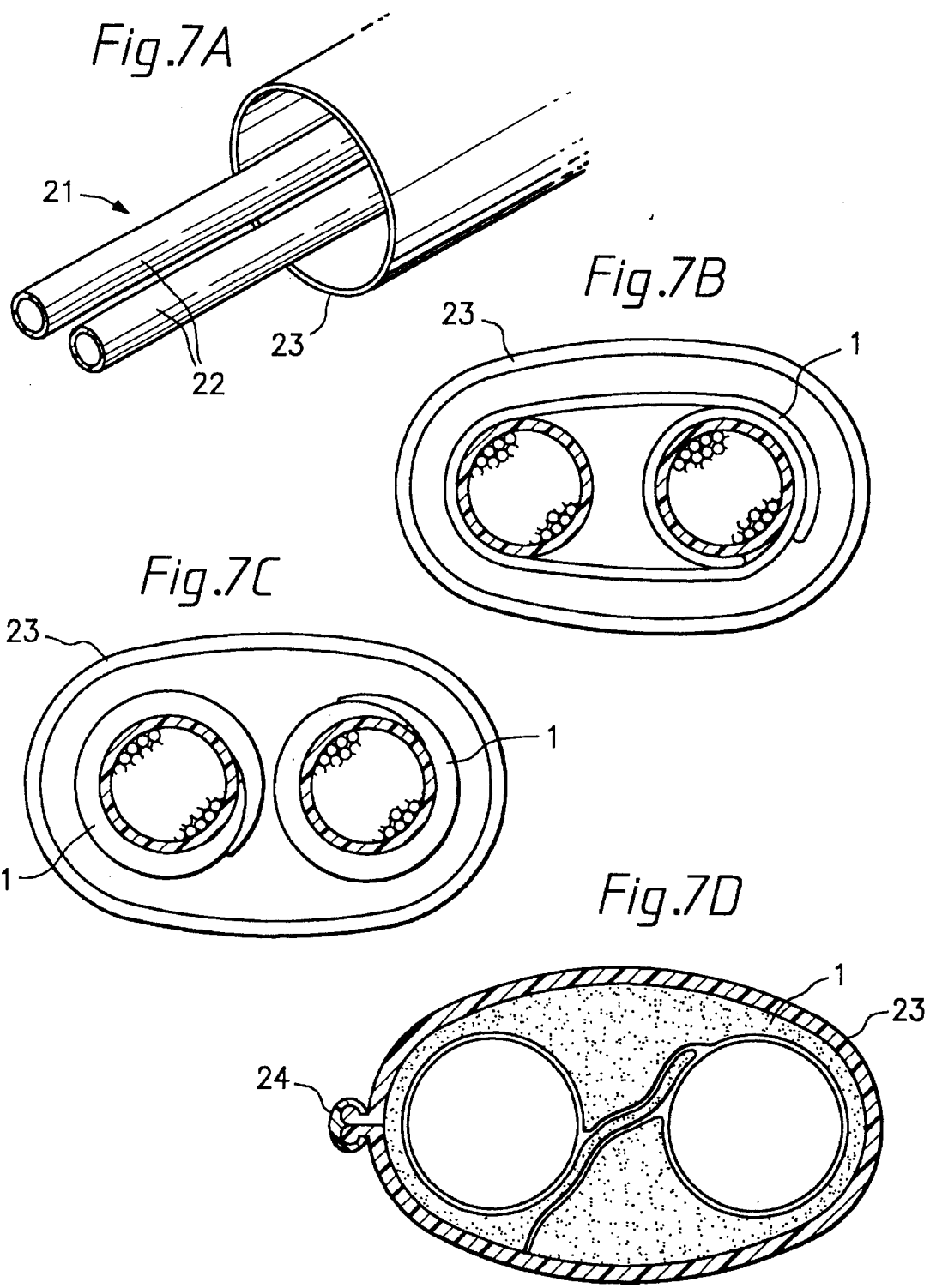

ENVIRONMENTAL SEALING

The present invention relates to environmental sealing of substrates such as cables or pipes, particularly within a duct, or a splice case. This may be done to prevent water, gas or other contaminant from passing along a duct into a manhole etc, or to protect a cable splice from the environment. The invention will be described primarily in terms of a duct seal, (which term includes "feedthroughs") but the invention is also applicable to other instances of sealing, including splice cases, pipe protection and grommets etc.

The reason that a seal (rather than an adhesive bond of no significant thickness) may be required is a disparity in size or shape between the substrate to be sealed and some other object such as a housing within which it lies. For example, a duct may be from several millimeters to several centimeters larger than the cable or other substrate that it carries, an oval cable may lie within a circular duct, or the installed size of a splice case housing may be larger than the spliced cables within it. Also, when a branch-out between two or more cables is to be sealed it will generally be necessary to convert their combined concave cross-section to a convex shape that can be enclosed by, say, a rigid wrap-around or other casing or by half-shells or a dimensionally-recoverable (generally heat-shrinkable) sleeve.

Such seals have usually been formed by the use of a conformable sealing member, for example an O-ring, or the use of a mass of sealant or a hot-melt adhesive. Whilst these seals in general work in a satisfactory manner, problems sometimes occur. For example, by their nature, conformable sealing members have a low modulus and especially where they are used to fill large voids, may have a tendency to creep over extended periods of time. Also, leak paths may occur if it has not been possible to introduce sufficient heat into a hot-melt adhesive to melt it. It is for example difficult to introduce heat into a duct.

Difficulties may also arise due to the materials needed for ducts and cables, which may be incompatible. Cables are often made of polyethylene or lead, and ducts of polyvinyl chloride, steel or cement which may be dirty or crumbly and difficult to clean.

A widely used duct seal, disclosed in GB 1594937 (Raychem), comprises a hollow body member provided on its inner and/or outer surface with a plurality of spaced apart flanges, each flange extending away from and around said surface and at least a portion of the flange remote from said surface being deformable, but only at an elevated temperature, and at least part of said surface(s) and/or the surface of the flanges having a sealant thereon.

EP 0179657 (Raychem) discloses a duct seal especially for sealing about four cables which contains a spring which, when operated, radially-expands that part of the duct seal that is to seal to the duct. The cables are sealed by heat-shrink outlets of the duct seal. The spring is operated after heating the part of the duct seal in which it lies. Heating may soften the material of the seal and activate an adhesive.

EP 0152696 (Raychem) discloses an assembly for sealing an aperture (such as that between a duct and a cable it carries) which comprises a flexible envelope that is arranged to be wrapped on itself for insertion into the aperture, the envelope having an opening therein for receiving an expansible or expanding filler material, for example a curable foam, for expanding the envelope, a container containing said expansible filler material, and means arranged to connect the container to the envelope to conduct the filler thereto for effecting expansion of the envelope, characterized in that an adhesive or sealant is located on or associated with at least part of the outer surface of the envelope. The disclosure of EP 0152696 is incorporated herein by reference.

Other patent specifications disclosing hollow envelopes for sealing include the following. EP 0100228 (Raychem) discloses a method forming a seal between at least one elongate object and a surface surrounding the or each object, which comprises:

(a) positioning between the object and the surface a flexible envelope containing a void-filling composition which is capable of undergoing a change from a state of lower viscosity to a state of higher viscosity;

(b) deforming at least part of the envelope thereby causing the void-filling composition to conform to the object and to the surface; and (c) causing said change from lower to higher viscosity.

EP 0210807 (Raychem) discloses a double-walled article, two of which may be used one around the other to form a duct seal, in the form of a tube having a small volume filling of a friction reducing liquid (preferable of high boiling point and low vapour pressure) or solid between its two walls. The article is able to revolve over a substrate by shear between its two walls to provide environmental or electrical protection.

GB 2006890 (Kraftwerk Union) discloses a seal comprising a container formed from resilient plastics sheet and partially filled with a liquid which is provided between a protective tube in a wall and insulation layer around a pipe. The container is of substantially toroidal shape and permits the pipe to move axially and radially whilst maintaining a seal between the insulation layer and the tube.

U.S. Pat. No. 3,038,732 (Scott and Bond) discloses an inflatable seal bushing for sealing a pipeline casing, which comprises a hollow resilient means having an inflated configuration to match the inside surface of said casing and to contact the outside surface of the pipe of said pipeline, means for introducing a fluid into said hollow resilient means to inflate same, and a plurality of angularly disposed, relatively solid spacer means integral with said hollow resilient means and transverse thereto for centring and supporting said pipe within said casing, each of said spacer means having a passage therethrough for providing liquid communication in the hollow interior of said hollow resilient means.

U.S. Pat. No. 2,816,575 (Stokes) discloses an apparatus for laying a pipe employing inflated annular sealing rings.

U.S. Pat. No. 3,339,011 (Ewers Jr. et al) discloses a pneumatically-sealed cable splice case comprising a longitudinally-split sealable cylindrical casing having means within and adjacent to each of its longitudinal ends to retain and space apart a pair of end wall panels each end wall panel including two semi-circular disc portions having rounded outer edges and inner edges including aligned cut-outs therealong.

whereby cables may enter said casing through said aligned cutouts, and inflatable seal means confined between each of said pair of panels of said end walls and having openings aligned with said panel openings, said inflatable means being expandable, when so confined, against such cables passed through said end wall openings, characterized in that said end walls are removable from the said means to retain them, and said semi-circular disc portions are pivotally pinned to each other with their cut-outs presented together to form said openings of said panels whereby said semi-circular disc portions may be pivotally opened apart for placement about said conduits.

An inflatable packing device for insertion between mating surfaces of the hub and spigot ends of a pipe joint is disclosed in GB 1077314 (Woodward Iron Company).

A hollow-walled sleeve into which fluid is to be injected for heat-insulation of ducts is disclosed in GB 1421960 (Commissariat l'Energie Atomique).

An inflatable closure member having a sealing material thereof, and used for sealing cables is disclosed in GB 2028601 (Raychem).

U.S. Pat. No. 907,136 discloses a packing for pipe joints formed by folding an open mesh fabric and applying a glue etc.

Whilst many of the articles disclosed in the above specifications are able to provide satisfactory seals, some problems remain. For example the use of curing or otherwise setting materials may prevent or make difficult subsequent removal of the article, and simple gas pressurization of a seal will generally mean that the article has a short life-time due to leaks or gas-diffusion. Also expensive, cumbersome, easily-damaged and corrodable metal valves are required that protrude from the articles.

I have now devised a duct seal or splice case or other sealing member that can in certain embodiments avoid these and other problems, and can function by simple air pressure inflating an envelope in the space between for example the duct and a cable it carries.

A surprising result is that I have been able to ensure that a hole through which the seal is inflated is reliably blocked on removal of any tube for inflation.

Thus the present invention provides a flexible hollow sealing member that can be inflated through a hole in a wall thereof to seal to a first article, the member having:

a first sealing material at an inwardly-facing surface of the wall, which first sealing material can be deformed to block the hole by pressure within the member when inflated; and means for maintaining, during deformation of the first sealing material, separation between the article and an outwardly-facing surface of the wall immediately adjacent the hole.

The means for maintaining can have one or more functions, to be explained below.

The sealing member may be supplied with the hole ready made, or the hole may be made during installation or otherwise as and when required. Also, the sealing member may be supplied with a tube (which may comprise a flexible plastics tube such as polytetrafluoroethylene or nylon etc, or it may comprise a metal or other rigid pipe) which may be pre-installed, prior to inflation, through the hole and through the first sealing material. Alternatively, the tube may be a tool; in which case it may be a disposable tool supplied with each sealing member as a kit, or it may be a reusable tool for use with many sealing members.

The means for maintaining separation of the article on the outwardly-facing surface of the wall may comprise a spacer located at the hole. In embodiments where a hole is to be made during installation, this means location at the position where the hole is to be made. In this case, the means for maintaining may act as a guide for any means (such as the tube itself) that will be used to make the hole. Similarly, if the hole is pre-formed but the sealing member is supplied without the tube in place, the means for maintaining may act to guide the tube into the hole.

In preferred embodiments, the means for maintaining forms a chamber around the hole (which again includes the location of a future hole). Such a chamber may be formed by an O-ring or washer or similar hollow article secured to the surface of the sealing member. A similar effect can be achieved if the means for maintaining separation is an integral part of the sealing member, for example a non-planar outwardly-facing surface of the wall.

If the outwardly-facing surface adjacent the hole is prevented from contacting the first article then the excess pressure within the sealing member will be able to drive some of the first sealing material through the hole at a sufficient flow rate, thereby ensuring that the hole is properly blocked. I have found that a certain amount of deformation and hence displacement of sealing material through the hole is desirable. If the wall of the sealing member were to move against the article to be sealed the pressure difference across the hole would very quickly reduce to almost zero. Insufficient displacement of sealing material might occur, and a permanent leak, albeit small due to the very small pressure difference, would remain.

The sealing member may have a second sealing material over an outwardly-facing surface of the wall, the sealing material preferably being absent above and around the hole. The second sealing material may abut the outside of the O-ring or other means creating a chamber around the hole, or it may itself constitute the means for maintaining separation.

When such a second sealing material is present, either on the sealing member as supplied or when installed, the means for maintaining separation may have a second or alternative function to that of helping to maintain a satisfactory pressure difference across, or initial flow through, the hole. The O-ring or other means can act as a barrier between the first sealing material (when it has emerged through the hole) and the second sealing material, or between components thereof. This may be useful where one material, or a component thereof, can damage the other material. For example, the first sealing material preferably comprises an oil-extended material such as a gel, and the second sealing material preferably comprises a mastic, which is oil-soluble. The gel will be under compression after inflation of the sealing material, and after long periods under unfavourable conditions some oil-separation may occur. Oil from the gel could perhaps cause deterioriation of an adjacent mastic in the absence of the O-ring or other means of the invention.

The O-ring or other means for maintaining may comprise any suitable material, and at present I prefer synthetic rubbers such as those based on a copolymer of vinylidene fluoride and hexafluoropropene, for example that known by the trade mark Viton.

In order that the sealing member be easily inflatable, the first sealing material (which is inside it) is preferably covered on its inwardly-facing surface with a release layer. Such a release layer may comprise a very thin, flexible polyethylene or other polymeric film, such as that known by the trade mark Cling Film. That sealing material may be retained in place by means of a polymeric flap secured to the wall such that the material is positioned between the flap and the wall.

Of the various benefits of the means for maintaining separation mentioned above, maintenance at least for a short while of a significant pressure difference across the hole is perhaps the most important. A wider range of designs of gel (or other) seal becomes possible. In the absence of the invention problems may arise if the sealing member is supplied with an inflation tube preinstalled through a hole in the gel or other first sealing material; and if an automatic seal is expected on withdrawal of the tube after inflation. Such automatic sealing by displacement of gel to block the hole, as described above, is desirable because the need for expensive, bulky, valves is avoided. The problems referred to may result from the gel or other material exhibiting some set after long periods with the tube in place. When the tube is finally removed after inflation, the hole that remains is difficult to close: hence the desire for a significant pressure difference to be maintained for a sufficient time.

Whilst the greatest benefits of the invention may be expected in connection with preinstalled tubes that penetrate a first sealing material having a tendency to set, the invention also provides the benefit of a more reliable automatic sealing in other situations. For example, the means for maintaining separation may be provided with other sealing materials, with designs where a preinstalled tube does not penetrate the sealing material (it may pass between such material and the wall of the sealing member) or where the inflating tube is inserted during installation.

Hollow sealing members of the invention were subjected to severe mechanical, temperature and pressure testing, and successful results were obtained. In particular, the sealing members were inflated to 50 KPa and tested for leaks for fifteen minutes to measure overall strength, and for 2.8 bar for long-term testing. Helium was used for inflation, and a sophisticated helium gas detector was used to monitor any leaks. I was able to produce an automatically sealing system where passage of helium through the hole used for pressurization was no greater than the background level resulting from mere diffusion through the walls away from the hole. Suitable wall materials (discussed below) can be chosen such that no helium is detectable. The precise nature of the materials and the design of the sealing member can be chosen depending on intended use; the surprising result, however, is that a hole directly through a wall of the member, or between the walls of a lap join etc can automatically seal without the need for expensive valves and all the disadvantages they bring. It is believed that inflatable articles have never previously been used for environmental sealing (particularly in the cable accessories art) where life-times of many years are required without the need for periodic reinflation.

Although not at present preferred, an internal flap may be provided across the hole in (or between) the walls of the member. The flap, together with the first sealing material, may seal in response to pressure within the member. The flap preferably comprises a flexible polymeric sheet fixed to a wall of the member such that the tube can pass through the hole and displace the flap, the tube preferably passing between the flap and the wall substantially in the plane of the wall (say at less than 45° to that plane). A sealing material, for example a gel or a mastic, may be provided between the flap and the wall, for example as a coating on the flap. The flap may be bonded or welded to the wall along two lines separated by a small gap (say 5–20 mm), such that the tube can be inserted through the hole in the wall and between the wall and the flap generally along the axis of the channel formed between the two bond or weld lines.

The hole may be provided between overlapping walls of a lap joint, although this again is not at present preferred. (The lap joint may arise in formation of the member by forming a tube from a sheet of material.) The hole, which extends the width of the lap joint, may decrease in cross-sectional size toward the outside of the sealing member. The hole may therefore have a funnel, or flattened-funnel, shape. A sealing material (preferably a mastic or a gel) may be provided within this funnel-or-other-shaped hole, such that the sealing material is driven by internal pressure to block the hole. The size of the hole and the physical properties and amount of the sealing material may be chosen such that the material does not creep out of the hole to an unacceptable extent. A flap as mentioned above may be used in conjunction with this type of hole.

As mentioned above, the first sealing material preferably comprises a gel. A gel may be formed by oil-extension of a polymeric material. The polymeric material may be cross-linked. I prefer that the gel has a hardness at room temperature as determined using a Stevens-Volland Texture Analyser of greater than 45 g, particularly greater than 50 g especially greater than 60 g. It preferably has a stress-relaxation less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8, more preferably at least 2.2 MPa. In general compression set will be less than 35%, especially less than 25%. Preferred gels are made by extending with an oil block copolymers having hard blocks and rubbery blocks. Examples include triblock copolymers of the styrene-ethylene-butylene-styrene type (such as those known by the Shell Trade Mark Kraton, eg G1650, 1651 and 1652). The amount of block copolymer may be, say from 5–35% of the total weight of the gel, preferred amounts being 4–15%, especially 6–12%, particularly about 7%. The amount of copolymer, and its molecular weight may be varied to give the desired physical properties such as hardness. The smaller the percentage of polymer, and hence the greater the percentage of oil, the less excess internal pressure is required to seal the hole that results from withdrawal of the tube.

The designs described above will find particular use for environmental protection of supply lines such as pipes and cables particularly telecommunications cables. In particular, they may be used for the formation of duct seals or splice cases. In the case of duct seals, the first article as referred to above will comprise a cable carried by a duct, and a second article to which the first article is sealed will comprise the duct. The duct seal will seal the annular space between the cable and the duct, and serve to prevent contaminants, in particular water, passing along the duct, for example into a manhole or building or other region to be kept dry or clean. Pressure may build up in the duct, and it is therefore desirable that means be provided for restricting movement of the duct seal along the duct in response to a pressure difference across it.

A second sealing material may be provided on an outwardly-facing surface of the sealing member to form a seal to the duct. If a mastic is used as the second sealing material, a release layer may be desirable in order that the duct seal be easily handled, in particular so that it can be readily inserted into the duct. A thin, flexible polymeric film may be provided on an outwardly-facing surface, for example over a mastic layer. Such a film can allow the mastic to deform to fill voids thereby eliminating leak paths, it can reduce tack facilitating installation, and can have a very high coefficient of friction, particularly to plastics materials such as polyvinyl chloride and polyethylene, typical materials from which cables and ducts are made. Preferred films comprise linear low density polyethylene, such as that known as "cling film". The surface of the sealing member that will face the duct may be covered with such a film to a greater extent (and optionally completely) providing greater friction to the duct than to the cable. The film may have apertures in it, allowing some direct contact between sealing material and first or second surfaces. The film may be provided between two layers of mastic or other sealing material to provide the combined laminate with strength. In that case, apertures in the film allow the two layers to bond to one another directly.

In use, there may be a tendency for a sealing material on the sealing member to be displaced, for example by pressure within a duct. Displacement can be restricted by means such as a strip of foam on a surface of the sealing member that can act, for example, as a dam.

The invention may also be used for environmentally-sealing a first article such as a cable or cable splice.

Here, the sealing member may be used together with a substantially rigid housing within which at least part of the first article can be placed.

The housing may be blind at one end, one or more sealing members being used to seal a cable entry and exit at the open end. In this way a cable splice case may be produced, to seal what is known as a radial distribution point in a telecommunications distribution network. Such design may also be useful for sealing a splice between optical fibre cables. In this case, the housing may contain one or more optical fibre splice organizers.

In another design the housing has at least two open ends, allowing production of an in-line (rather than butt) splice case, for copper or fibre cables. Such a housing may be of tubular or wrap-around design. Where branching cables are to be sealed, the sealing member may be positioned between branching cables, and between those cables and the housing, or other second article. In general, the member will pass between the branching cables and be wrapped around the branching cables together.

The invention also provides a method of environmentally-sealing a first article, such as a cable, which comprises:

at least partially positioning the first article within a second article (such as a duct or a wrap-around or other housing), positioning between the first and second articles a sealing member of the invention, and inflating the sealing member to seal a gap between the first and second sealing members.

Inflation may be carried out by attaching the tube to a source of pressurizing fluid and (if it is not supplied in place) inserting the tube through the hole in the wall (or between walls) of the sealing member. The pressurizing fluid is preferably compressible, air or nitrogen or other inert gas being preferred. If a liquid, such as water, is used it will generally be necessary for the sealing member to be stretchable in order that a reserve of pressure be provided to compensate for movement of the first and second surfaces. If the sealing member is stretchable is is likely to be subject to creep or set. I prefer that it have minimal stretch and that a gas be used for inflation.

The sealing member, being flexible, will deform on inflation into sealing engagement with the first and second articles, for example by filling an annulus between a cable and a duct within which it lies. A seal can be made inspire of lack of concentricity between duct and cable, and inspire of oval or other awkward cross-sectional shapes of the cable and/or duct. When the desired internal pressure is reached, the tube may be simply withdrawn, allowing the internal pressure automatically to close the hole. Astonishingly, high internal pressures can be achieved and a seal that will last for many years can be made in this way.

It is desirable that inflation be not too rapid since the sealing member itself, and any sealing material it carries must deform properly into sealing engagement with cable and duct. A hand pump (such as a bicycle pump), an electric pump, a pressurized gas cylinder or other suitable pressurizing means may be used. More powerful pumps may desirably be used with a pressure reducer.

The wall of the sealing member will in general be flexible, and thus able to conform to substrates of various sizes and/or of irregular or awkward shape. It may comprise at least three layers, for example one serving to retain the fluid, one to provide mechanical strength for example tensional strength against internal pressure, tear-strength or puncture resistance and one layer serving to form a seal to the substrate by accommodating small scale irregularities in the surface of the substrate. To this end the wall may comprise a first layer of metal (or metallized plastics material or metal-coated plastics material) optionally with which the fluid is in contact, and a second strengthening layer such as high density polyethylene, together with a third layer, in direct or indirect face-to-face relation with the first layer, and positioned between the first layer and the substrate. The third layer referred to above may comprise a deformable material such as a rubber or other elastomer or a foam. Other materials may be used as this third layer, for example sealing materials such as sealants, for example as referred to above. I prefer for many uses that no permanent adhesion occur between the sealing member and the duct and cable. In general I prefer that the second layer have a hardness of from 35–85, more preferably 40–80, especially 45–75 shore. The various functions referred to above may, however, be provided by fewer layers, where one layer has two or more functions.

The wall may comprise for example a laminate of a metal film and a layer of plastics material either side. Such plastics layers may allow the wall to be heat-welded to itself to make the envelope. A flap weld or bond, which will be under shear rather than peel when the article is inflated, preferably extends along the length of the sealing member where the sealing member is generally cylindrical. Simple welds that will be in peel may then be formed by hot stamping to close its ends.

Additional layers may be provided for mechanical strength such as oriented, for example biaxially-oriented or two layers of uniaxially oriented, high density polyethylene such as that known by the trade mark Valeron. A possible structure is as follows; the dimension being merely preferred.

| | |
|---|---|
| Copolymer | 15–30 microns. |
| Valeron (trade mark) | 40–160 microns |
| Mylar (trade mark) | 10–30 microns |
| Aluminium (as one or more layers) | 5–60 microns |
| Mylar (trade mark) | 10–30 microns |
| Linear low density Polyethylene | 0–80 microns |
| Copolymer | 15–30 microns |

An alternative structure comprises

| | |
|---|---|
| Rayofix T (trade mark) | 75–125 microns |
| Polyester "O" (such as Mylar) | 75–125 microns |
| Aluminium | 8–16 microns |
| Polyester "O" (such as Mylar) | 75–125 microns |
| Rayofix T | 75–125 microns |

"Rayofix" is a terpolymer comprising ethylene butylacrylate, acrylic acid and ethylene groups.

These structures may be varied for example by omitting the mylar or using a different material in its place. Furthermore, each layer may be provided with a coating to aid bonding or welding, for example a polyurethane may be applied and suitable thickness corresponds to 3.7 g/m². The copolymer should allow heat bonding or welding, and may comprise a hot melt adhesive such as one based on ethylene vinyl acetate. Greater thickness of the copolymer (for example up to 200 microns could be used at bond/weld lines for better filling to cover irregularities. Additionally or alternatively a polyamide based adhesive could be used. The structure preferably has an elongation to break of at least 10%, preferably at least 20%. This structure may be used within an envelope for example one comprising a polymer such as an elastomer, such as rubber, optionally reinforced for example with nylon. Alternatively, it may be laminated to such a polymer, or it may be used alone. The additional material may reduce creep.

In general, it is merely necessary that sealing contact between the duct wall and the cable or other substrate occur along a line that cuts across any potential leak path, although an area of contact of significant width may be preferred. It may be sufficient, therefore, for a sealing member to have a thin strip of rubber, or other layer such as gel or mastic referred to above, that extends over part only of its surface.

The invention is further illustrated by the accompanying drawings, in which:

FIG. 1 shows a duct seal in use;

FIG. 3 shows various layers of a sealing member in a partially wrapped configuration;

FIGS. 7A, 7B, 7C and 7D show sealing of a branched cable splice using the sealing member.

Figure 2:
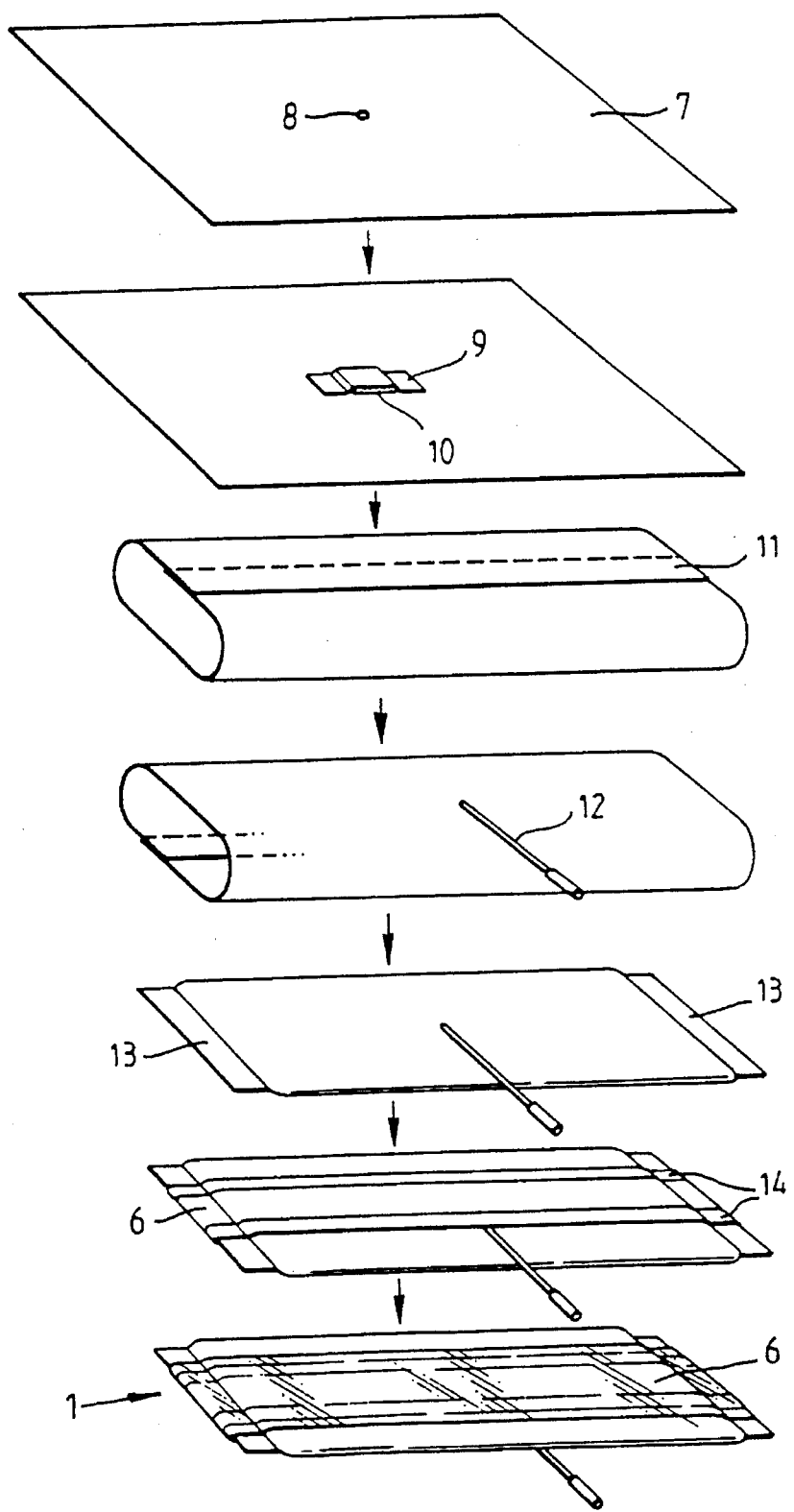
FIG. 2 shows formation of a sealing member.

In FIG. 1 a sealing member 1 is shown as a duct seal, sealing an annular gap between a cable 2 and a duct 3. The sealing member 1 has flexible, and preferably substantially non-stretchable, walls 4 between which a pressurizing fluid such as air 5 is introduced. An outer surface of the walls 4 may be provided with a sealing material 6, such as a mastic, to fill irregularities in the surface of the duct.

FIG. 2 shows a way in which a sealing member 1 may be made.

A sheet 7 of material, preferably a laminate, is provided with a hole 8 through which a tube will later be inserted to inflate the sealing member. The hole 8 is covered with a flap 9, a sealing material 10 optionally being provided between the sheet and the flap 9. Next, the sheet 7 is formed into a tube, and a lap join 11 is formed by welding or bonding. In the next step a tube 12 for later pressurization is positioned along the surface of the sheet 7 and into the hole 8. Thus, the product may be supplied with such a tube in place. Alternatively, the tube may be supplied separately. In that case, it may be desirable for some means to be employed in manufacture to prevent a future path for the tube from becoming blocked, or at least to provide indication as to where the tube should later be inserted since the hole 8 will in general not be visible.

After insertion of the tube 12, end seals 13 are made, again by welding or bonding, optionally with folding. The following step involves applying inner sealing material 6 between foam or other dams 14 that restrict its displacement during service. The outer sealing material 6 has been applied in the last step. Such a layer may be covered by a cling film or other suitable very thin and very flexible layer. It may serve to reduce tack, and increase friction. The outer and inner extra layers may be reversed.

The sealing member 1 of FIG. 3 is shown in a partial wrapped-around configuration. The reference numbers correspond to those used above. In addition a layer of sealing material 15, such as mastic, is positioned on what will be an inwardly-facing surface that engages a cable.

Figure 4A:
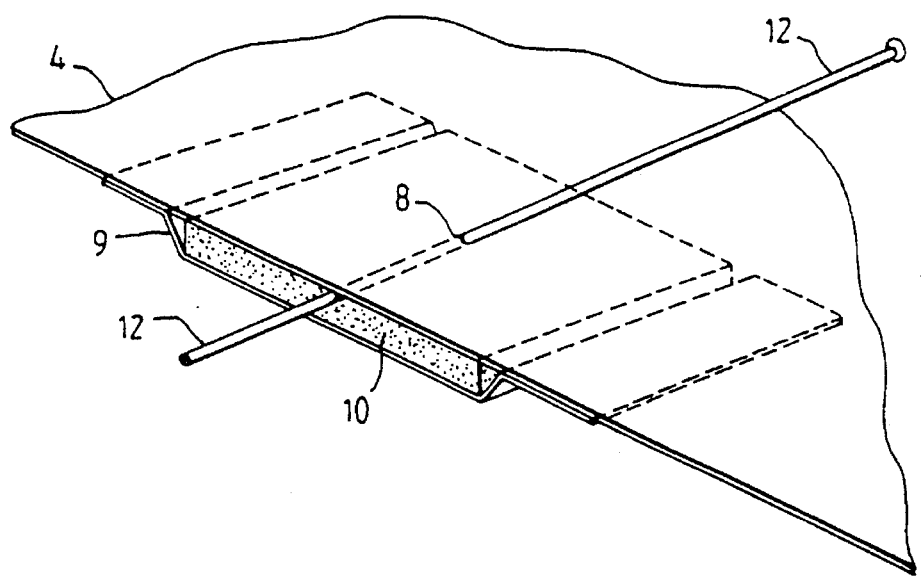
FIGS. 4A, 4B and 4C show use of a tube with a sealing member.
Figure 4B:
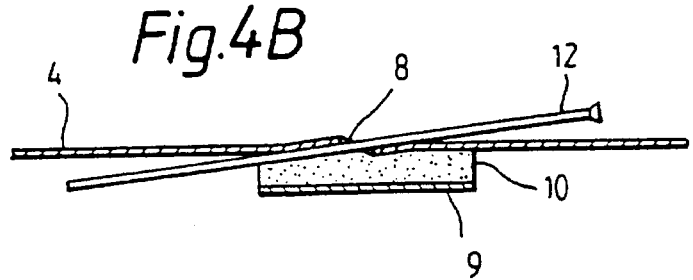
Figure 4C:
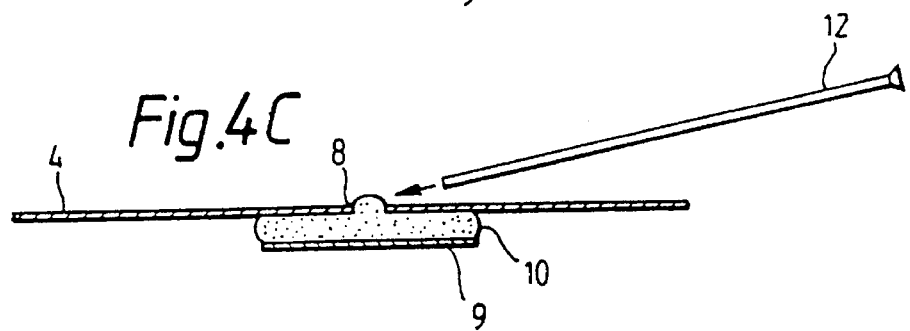

FIGS. 4A, 4B and 4C show insertion and withdrawal of a tube 12. The tube has been withdrawn by mere pulling, no unscrewing etc being necessary since it was previously held in place by mere friction or weak adhesion. It is surprising that satisfactory inflation and subsequent sealing can be achieved without a screw or bayonett or other mechanical connection between probe and wall. In FIG. 4C internal pressure has forced some sealing material 10 through hole 8 ensuring a perfect seal. FIGS. 5 and 6 below show how the invention can ensure that this occurs.

Figure 5A:
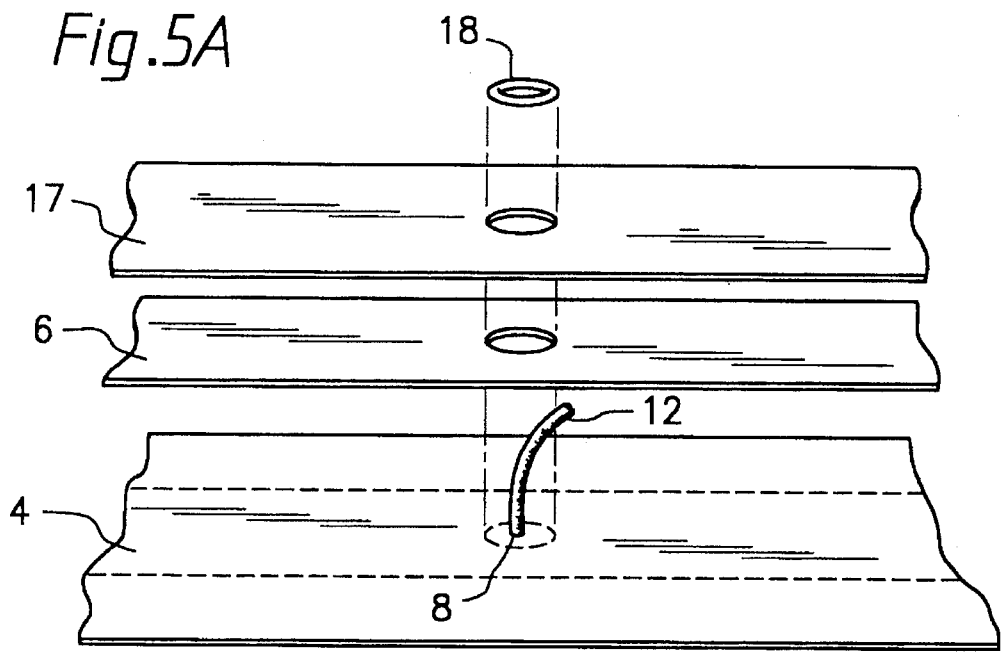
FIGS. 5A, 5B and 5C show incorporation of an O-ring into a wall of a sealing member.
Figure 5B:
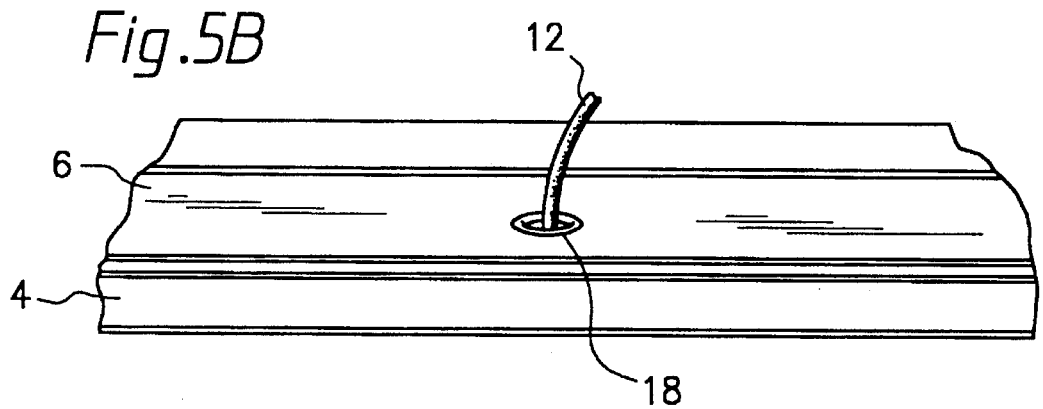
Figure 5C:
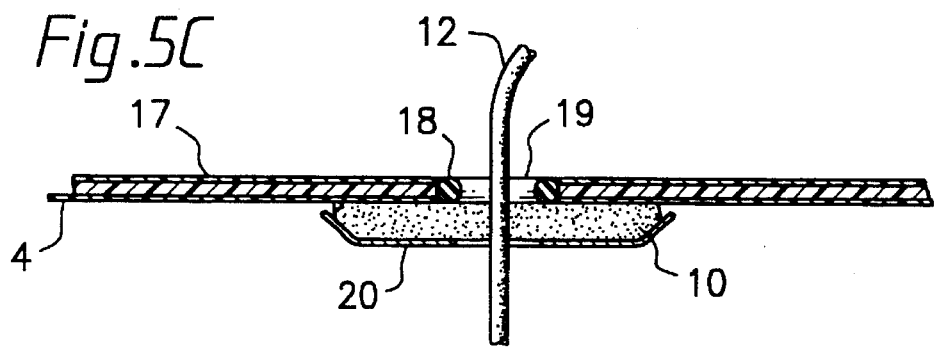

A sealing member of the invention is shown in part in FIG. 5A which is an exploded view, FIG. 5B which is a perspective view, and FIG. 5C which is a cross-sectional view.

These figures show a wall 4 of the sealing member; a second sealing material 6 such as a mastic on an outwardly-facing surface; a release layer 17 covering material 6; a tube 12 passing through a hole 8 in the wall; and an O-ring 18 serving as the means for maintaining separation of the wall 4 from a surface to be sealed such as that of the inside of the duct 3 of FIG. 1. The O-ring can be seen to form a chamber 19 around the hole 8 allowing room for sealing material 10 to exude from the hole. Since the wall 4 cannot quickly become flush against an external surface, such as the wall of a duct, a low pressure (generally 1 bar) will exist at the outside of the hole, allowing the excess internal pressure (for example 2–3 bar gauge) resulting from inflation to displace the gel 10 as required.

Figure 6A:
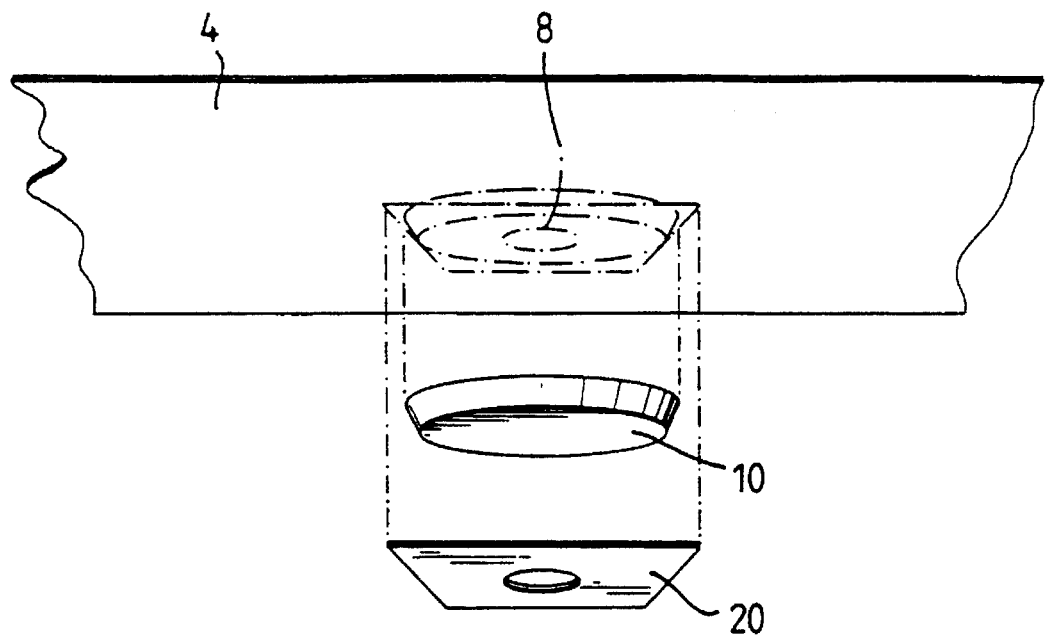
FIGS. 6A and 6B show a preferred form of first sealing material for use with the invention.
Figure 6B:
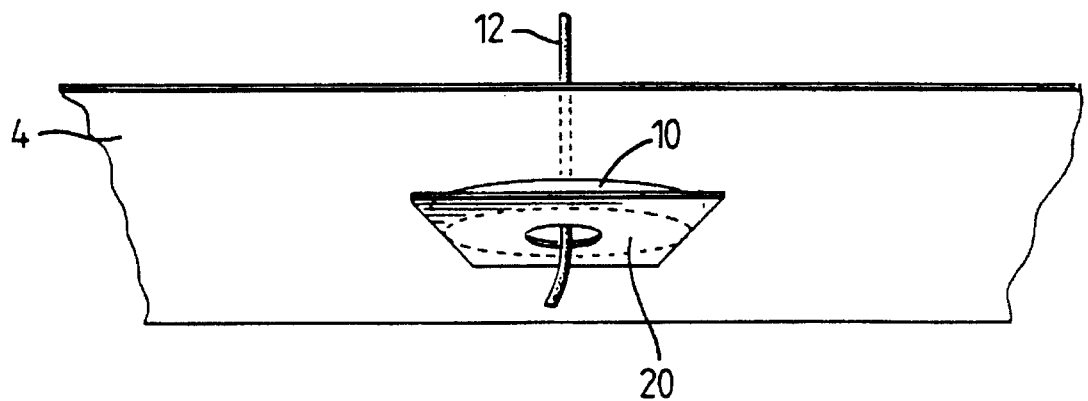

FIG. 6A shows the attachment by bonding or otherwise of a disc 10 of gel or other sealing material to an inwardly-facing surface of a wall 4 of a sealing member. The gel is placed underneath (as drawn) a hole 8 through which a tube will be passed to inflate the sealing member. The area below the fragment of wall 4 shown is, of course, within the sealing member, and the area above it is outside. In order to prevent the gel 10 sticking the wall 4 to an opposing wall (not shown) the gel may be covered by a release layer 20, comprising a polymer such as that used for "cling film". The release layer may have a hole therethrough as drawn in order that an inflation tube may pass through the gel and release layer substantially perpendicular to the surface of the wall. FIG. 6B shows the gel, release layer, and wall in their assembled configuration.

FIGS. 7A, 7B, 7C and 7D show the sealing member used to seal an outlet of a cable splice case 21 housing a branched cable splice. FIG. 7A shows two cables 22 leaving a housing 23. A cross-section near the end of the housing is shown in FIGS. 7B and 7C. In FIG. 7B one sealing member 1 has been wrapped around the two cables, and is shown before inflation. In FIG. 7C two sealing members 1 are used, one around each cable. The effect of inflating a sealing member is shown in FIG. 7D. The sealing member can be seen to seal the space between the housing 23 and the cables 22 thus preventing contaminants from entering the splice case. (Overlapping layers of the sealing member are shown slightly separated for clarity.) The housing 23 of FIG. 7D is of the wrap-around type, a closure being shown at 24.

For the avoidance of doubt it is mentioned here that the invention provides various sealing members, sealing materials and articles, and methods of manufacture and of use concerned with environmental sealing or blocking. In particular, any of the materials, article designs, sealing strips, valves may be selected.

We claim:

1. A flexible hollow sealing member that can be inflated to seal a gap between a first article and a second article, the sealing member having:
 a wall, and a hole in the wall through which the sealing member can be inflated;
 a first sealing material on a surface of the wall which is inside the sealing member, which first sealing material can be deformed to block the hole by pressure within the sealing member when the sealing member is inflated;
 a second sealing material on a surface of the wall which is on the exterior of the sealing member, the second sealing material being absent above the hole and around the hole immediately adjacent thereto; and
 means for maintaining, during deformation of the first sealing material, separation between (a) one of the first and second articles, and (b) the exterior surface of the wall immediately adjacent the hole, which means for maintaining serves also as a barrier between the hole and the second sealing material.

2. A sealing member according to claim 1, in which the means for maintaining comprises a spacer localized at the hole.

3. A sealing member according to claim 1, in which the means for maintaining forms a chamber around the hole.

4. A sealing member according to claim 3, in which the means for maintaining is selected from the group consisting of an O-ring or a washer.

5. A sealing member according to claim 1, in which the first sealing material comprises a gel.

6. A sealing member according to claim 1, in which the second sealing material comprises a mastic.

7. A sealing member according to claim 1, in which the means for maintaining is formed from rubber.

8. A sealing member according to claim 1, in which an inwardly-facing surface of the first sealing material is covered with a release layer.

9. A sealing member according to claim 1, which further comprises a flap secured to the surface of the wall which is inside the sealing member and the first sealing material is positioned between the wall and the flap.

10. A sealing member according to claim 1, in which the wall comprises a laminate of a metal and a polymeric material.

11. A sealing member according to claim 1, in which the wall is substantially non-stretchable under installation and service conditions.

12. A sealing member according to claim 1, having the form of an elongate envelope that can be wrapped around a cable and inflated to form a duct seal between the cable and a duct surrounding the cable.

13. A sealing member according to claim 1, which additionally has:
 a tube through which fluid can be introduced into the sealing member to inflate it.

14. A sealing member according to claim 1, in which the means for maintaining is selected from the group consisting of an O-ring or a washer; the first sealing material comprises a gel; and the second sealing material comprises mastic.

15. A sealing member according to claim 14, having the form of an elongte envelope that can be wraped around a cable and inflated to form a duct seal between the cable and a duct surrounding the cable.

\* \* \* \* \*